United States Patent [19]
Shibata

[11] Patent Number: 5,341,446
[45] Date of Patent: Aug. 23, 1994

[54] OPTICAL CONNECTOR

[75] Inventor: Sueji Shibata, Tokyo, Japan

[73] Assignee: Yamaichi Electronics Co., Ltd., Tokyo, Japan

[21] Appl. No.: 100,267

[22] Filed: Aug. 2, 1993

[30] Foreign Application Priority Data

Aug. 25, 1992 [JP]  Japan .................................. 4-248627

[51] Int. Cl.⁵ .............................................. G02B 6/36
[52] U.S. Cl. ...................................... 385/78; 385/86; 385/88
[58] Field of Search .................. 385/81, 78, 88, 70, 385/53, 56, 58, 60, 62, 69, 70, 72, 76, 86, 87, 136, 137

[56] References Cited

U.S. PATENT DOCUMENTS 4,415,232  11/1993  Caron ..................................... 385/70
4,812,006  3/1989  Osborn et al. ......................... 385/78

FOREIGN PATENT DOCUMENTS 58-91418  5/1983  Japan ..................................... 385/81

Primary Examiner—Rodney B. Bovernick
Assistant Examiner—John Ngo
Attorney, Agent, or Firm—Wenderoth, Lind & Ponack

[57] ABSTRACT

A sleeve is fixedly fitted onto a terminal of an optical cable, and a disengagement preventing claw formed on the sleeve by cutting and raising its peripheral wall is brought into engagement with an inner surface of a recess which is formed in an inner surface of a cable receiving port of a connector housing. With this construction, the optical cable can be connected to the connector housing without using the conventional plug.

4 Claims, 4 Drawing Sheets

OPTICAL CONNECTOR

BACKGROUND OF THE INVENTION

1. Field of the Invention

This invention relates to an optical connector, which is capable of connecting an optical cable to a connector housing without using a plug.

2. Description of the Prior Art

As shown in FIGS. 6 and 7, heretofore, for connection of a plastic optical cable to a connector housing, a plug 2 is fitted onto a terminal of an optical cable 1 with its end face exposed at one end face of a ferule 3 projecting forwardly of the plug 2, and the ferule 3 is inserted into a plug receiving hole 5 of the connector housing 4. Then, a coupling 6 fitted onto the plug 2 is brought into engagement with an outer peripheral surface of the plug receiving hole 5, and at the same time a tab 8 formed on the outer peripheral surface of the plug receiving hole 5 is fitted into a retaining hole 7 which is formed in the coupling 6. As a result, the optical cable 1 is connected to the connector housing 4 through the plug 2. An end face (optical cable end face) of the ferule 3 of the plug 2 is placed opposite to an optical element 9 such as an LED accommodated within the connector housing 4, with a terminal 10 of the optical element 9 projecting outwardly of the connector housing 4 so as to be connected to a printed circuit board, etc.

Because plastic optical cable is very cheap compared with glass optical cable, the former is used in many cases. As the use of the plastic optical cable is increased, a reduction in cost of the connector structure is increasingly demanded. However, there is a limit in the cost reduction available by simplifying the plug structure.

SUMMARY OF THE INVENTION

It is therefore an object of the present invention to provide an optical connector, which is capable of connecting an optical cable in a simple manner.

Another object of the present invention is to provide an optical connector, which is simple in structure and for which the number of parts is reduced relative to other connectors, thereby achieving cost reduction.

A further object of the present invention is to provide an optical connector, in which the connector can be made small in size, thereby reducing the space required for a connection area thereof.

To achieve the above objects, according to the present invention, there is provided an optical connector comprising a sleeve fitted onto a terminal of an optical cable, a disengagement preventing claw formed on the sleeve by cutting and raising a peripheral wall of the sleeve outwardly, and a connector housing including a cable receiving port into which the sleeve is inserted, the disengagement preventing claw being resiliently restored into a recess which is open to an inner surface of the cable receiving port, so that a foremost end of the disengagement preventing claw can be brought into engagement with an inner surface of the recess. The recess may be constructed by a through-hole which is open outwardly. In that case, the through-hole serves as means for disengaging the disengagement preventing claw.

The above and other objects and further features and advantages of the present invention will become more manifest to those skilled in the art upon a reading of the following detailed description taken in conjunction with the accompanying drawings.

DETAILED DESCRIPTION OF THE EMBODIMENTS

Figure 6:
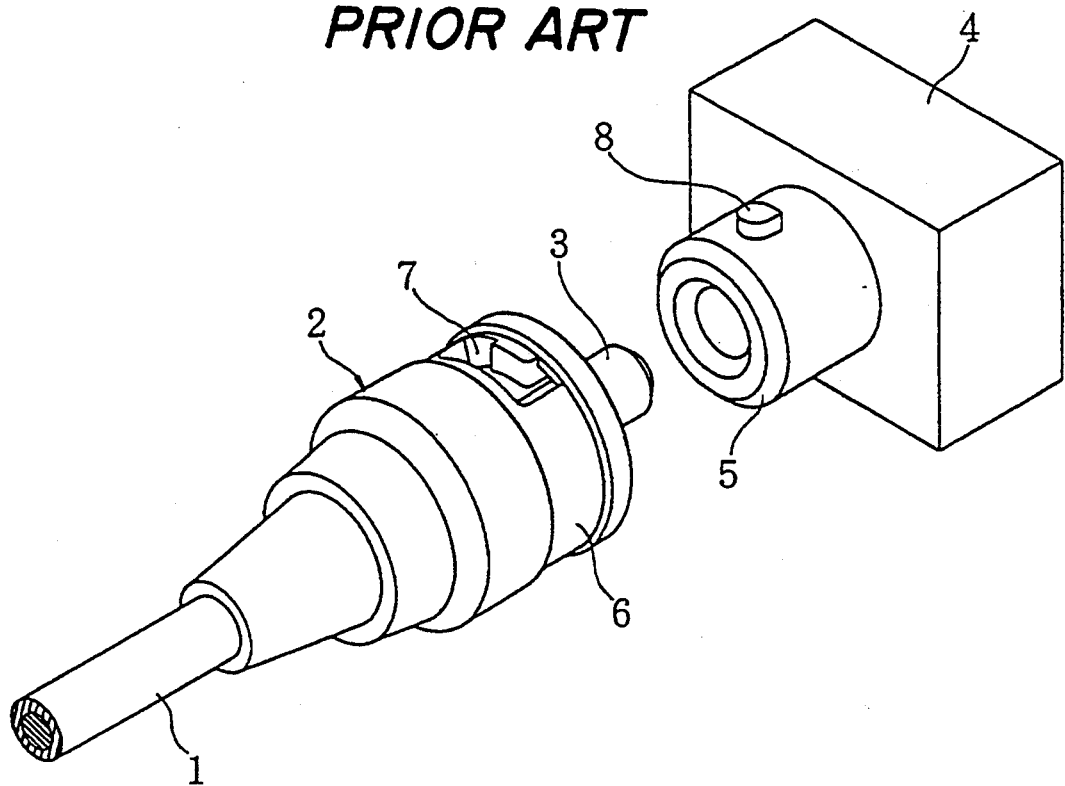
FIG. 6 is an exploded perspective view of an optical connector according to the prior art.
Figure 7:
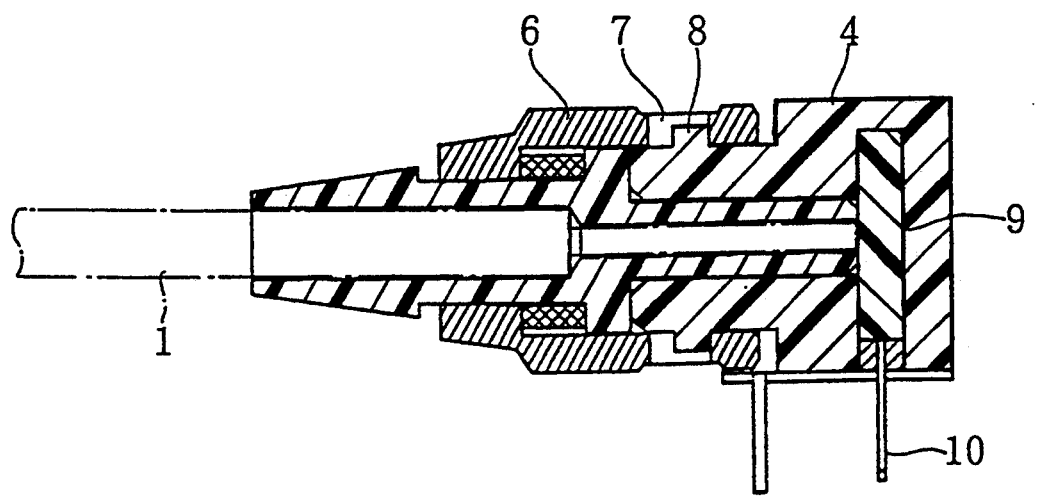
FIG. 7 is a sectional view of the connector of FIG. 6.

The embodiments of the present invention will now be described in detail with reference to FIGS. 1 through 5. In these embodiments, reference numerals are used irrespective of those used in connection with the prior art of FIGS. 6 and 7. In FIGS. 1 through 4, reference numeral 11 denotes a photoelectric converting element represented by an LED, reference numeral 12 denotes a connector housing of an insulative material for accommodating the photoelectric converting element 11, and reference numeral 14 denotes a sleeve fitted onto a terminal of an optical cable 13.

The optical cable 13 is comprised of a plastic core wire 13a and a shading coating material 13b applied to the surface of the core wire 13a. The photoelectric converting element 11 is a package having a flat and square overall configuration which is comprised of a bear element and a light transmitting and insulative coating material made of a synthetic resin material or the like, with its electric terminal 11a projecting outwardly.

The connector housing 12 is integrally formed of an insulative material such as, for example, a synthetic resin material. The connector housing 12 includes an accommodation chamber 12a for accommodating the photoelectric converting element 11, and a cable inlet port 12b projecting outwardly from its front surface. The cable inlet port 12b has a cable insertion hole 12c which is opened at the front surface of the cable inlet port 12b and communicated with the accommodation chamber 12a.

Figure 1:
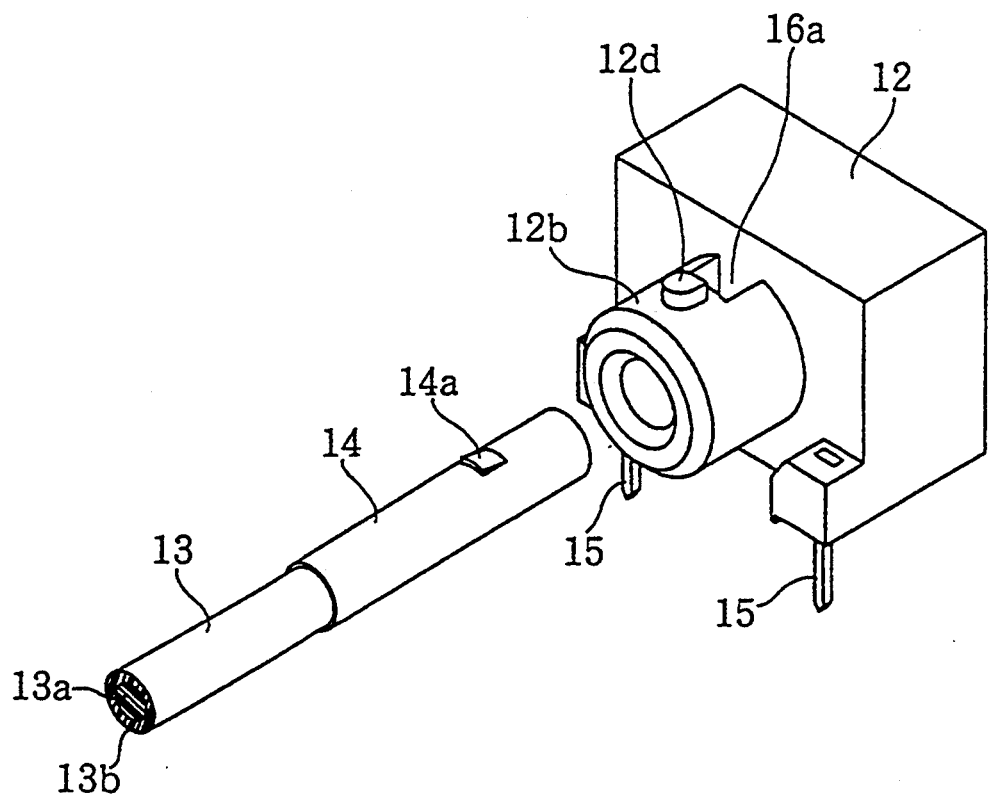
FIG. 1 is an exploded perspective view showing one embodiment of an optical connector according to the present invention.
Figure 2:
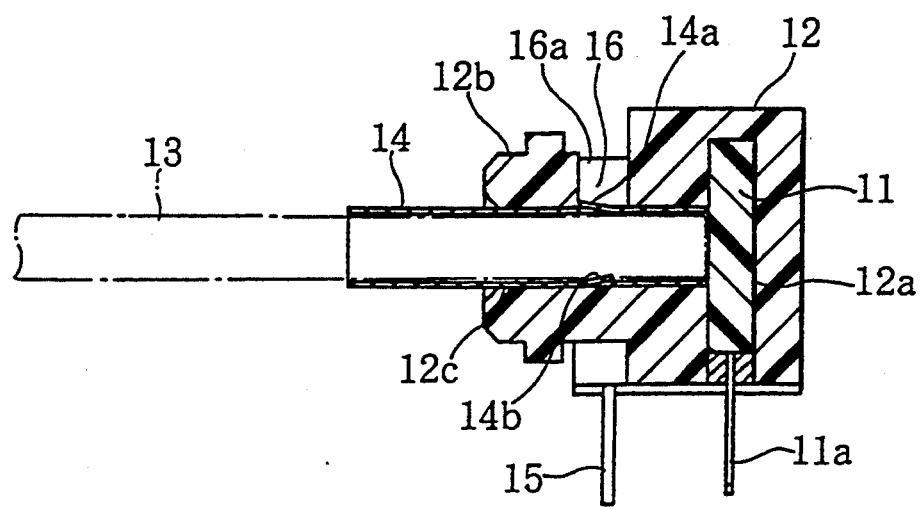
FIG. 2 is a sectional view of an assembly of the above.
Figure 3:
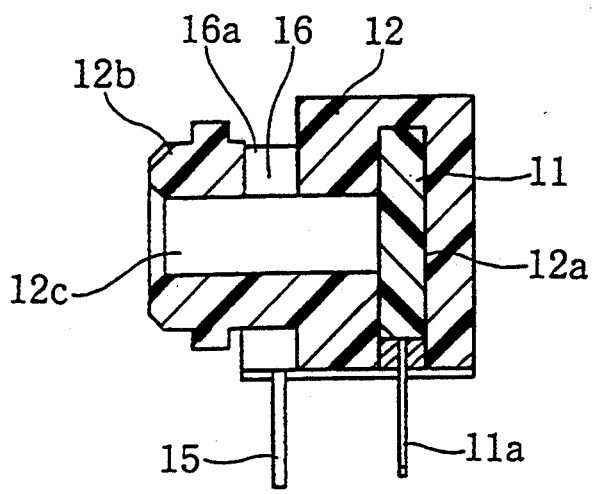
FIG. 3 is a sectional view of a connector housing of the above.
Figure 4:
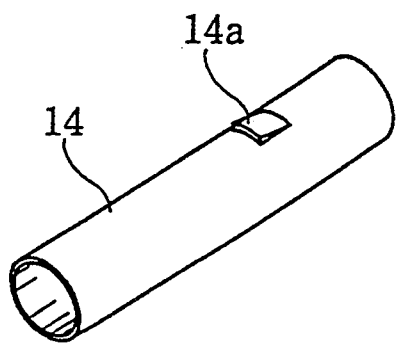
FIG. 4 is a perspective view of a sleeve of the above.

As shown in FIG. 2, the terminal 11a of the photoelectric converting element 11 accommodated within the connector housing 12 projects outwardly of the housing 12 so as to be connected to a printed circuit board (not shown). The housing 12 is provided at its front surface with a pair of opposing pin terminals 15 which are to be connected to the printed circuit board so as to serve as grounding means and also as means for firmly mounting the connector housing 12 to the printed circuit board.

The sleeve 14 is formed of metal and is integrally fitted onto the terminal of the optical cable 13 through an adhesive agent or the like, and then the sleeve 14 is inserted into the cable insertion hole 12c of the cable receiving port 12b of the connector housing 12 in order to interconnect the optical cable 13 and the connector housing 12 through the sleeve 14. As connection means for them, a disengagement preventing claw 14a is provided at the periphery of the sleeve 14. This disengagement preventing claw 14a is formed by cutting a peripheral wall of the sleeve 14 and raising that part of the peripheral wall. As a counterpart of the disengagement preventing claw 14a, a recess 16 is formed to open through an inner surface of the receiving port 12b (i.e., inner surface of the cable insertion hole 12c) into which the sleeve 14 is inserted. As a result,, when the optical cable 13 is inserted into the cable insertion hole 12c through the sleeve 14, the sleeve 14 is elastically displaced by being pressed by an inner surface of the cable insertion hole 12c during its insertion process. And at the completion of insertion, the sleeve 14 is elastically restored (outwardly) into the recess 16 and the disengagement preventing claw 14a is brought into engagement with an inner surface of the recess 16 in order to prevent disengagement.

The connection between the optical cable 13 and the connector housing 12 is achieved by the sleeve 14 and the receiving port 12b into which the sleeve 14 is inserted. In this connection means, the conventional plug is not used and the sleeve 14 acts as the plug.

As one preferred embodiment, the recess 16 (in which the disengagement preventing claw 14a is engaged when the sleeve 14 is elastically restored) is comprised of a throughhole which is opened outwardly of the cable receiving port 12b (see FIG. 2). More specifically, the recess 16 is comprised of a through-hole formed through a wall and forming the cable insertion hole 12c at a basal portion of the cable receiving port 12b. The recess 16 open through an outer surface of the cable receiving hole 12b, and this opening serves as a tool insertion port 16a. A tip of the tool is inserted into the tool insertion port 16a to push the disengagement preventing claw 14a inwardly by its tip portion, so that the sleeve 14 is disengaged from the recess 16.

In case it is desired to use the housing 12 with a conventional plug, a tab 12b is formed on an outer surface of the receiving port 12b for engagement with a coupling. The sleeve 14 is further provided with a cable clamping claw 14b for clamping the terminal of the optical cable 13 fitted into the sleeve 14. This cable clamping claw 14b is formed by cutting and raising a peripheral wall of the sleeve 14, preferably by cutting and raising that portion of a peripheral wall opposite to the disengagement preventing claw 14a so as to allow the clamping claw 14b to be brought into engagement with the shading coating material 13b.

The clamping claw 14b is cut and raised in a slanted direction toward the foremost end of the optical cable 13, while the disengagement preventing claw 14a is cut and raised in a slanted direction backwardly (toward the extension) of the optical cable 13. The clamping claw 14b is effective to prevent the optical cable 13 from being disengaged from the sleeve 14, while the disengagement preventing claw 14a is effective to prevent the sleeve 14 from being disengaged from the connector housing 12. The optical cable 13 is secured to the sleeve 14 by only the clamping claw 14b, by both the clamping claw 14b and the adhesive agent.

In this way, the optical cable 13 is removably engaged with the connector housing 12 through the sleeve 14, and the optical cable 13 is placed opposite to an optical element such as the photoelectric converting element 11 at one end face of the sleeve 14.

Figure 5:
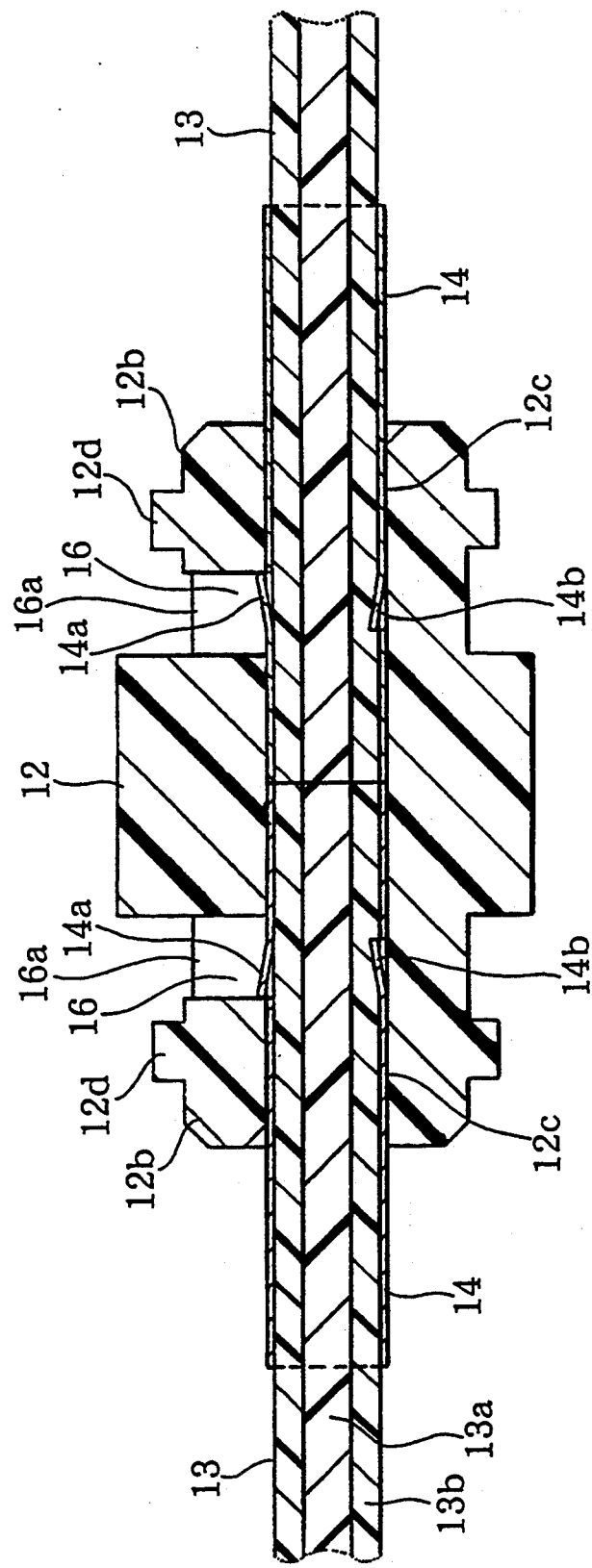
FIG. 5 is a sectional view showing another embodiment of an optical connector according to the present invention.

FIG. 5 shows an optical connector for interconnecting two optical cables opposite one another. The connector housing 12 has two cable receiving ports 12b projecting in opposite direction, one from a front surface and the other from a rear surface thereof. The sleeves 14 are fitted respectively onto the abutting terminals of the optical cables 13. By inserting the sleeves 14 into the corresponding cable insertion holes 12c which are coaxially communicated with each other, each disengagement preventing claw 14a is resiliently restored within the recess 16 formed in the inner surface of each cable insertion hole 12c for engagement in the inner surface of the recess. As a result, the end faces of the optical cables are placed in opposing relation to each other at the end faces of the sleeves 14.

In the above optical connector, a pair of plugs to be attached respectively to the terminals of the optical cables are not used, and the optical cables 13 and the connector housing 12 are connected to each other and the optical cables 13 are placed in opposing relation to each other both through the pair of sleeves 14.

As described in the foregoing, with a very simple construction wherein a sleeve is fitted onto a terminal of an optical cable and a disengagement preventing claw formed on the sleeve by cutting and raising a peripheral wall of the sleeve is brought into engagement in a recess formed in an inner surface of a receiving port of a connector housing, the optical cable and the connector housing can easily be connected to and engaged with each other. Since the above connection is achieved without using the conventional plug with a coupling, the number of parts can be reduced and the cost can be decreased extensively. This invention can be applied to a connector for a plastic optical cable with a shading coating material. As a result, the advantages of the plastic optical cable being inexpensive widely used for various purposes can be fully enjoyed, and thus marketability can be promoted.

While the invention has been described in detail in the form of preferred embodiments, it should be understood that the invention is by no means limited to those embodiments. Obviously, many changes and modifications can be made without departing from the scope of the appended claims.

What is claimed is:

1. An optical connector comprising:
    a sleeve fitted onto a terminal of an optical cable;
    a disengagement preventing claw formed on said sleeve by cutting and raising a peripheral wall of said sleeve outwardly;
    a connector housing including a cable receiving port into which said sleeve is inserted, said disengagement preventing claw being resiliently restored into a recess which is open to an inner surface of said cable receiving port, so that a foremost end of said disengagement preventing claw is brought into engagement with an inner surface of said recess; and
    wherein said recess is constructed by a through-hole which is open outwardly, and said through-hole serves as a means for disengaging said disengagement preventing claw.

2. An optical connector comprising:
    a sleeve mountable about an end of an optical cable;
    a resilient disengagement preventing claw projecting outwardly from a peripheral wall of said sleeve;
    a connector housing including a cable receiving port portion having an outer surface and having a cable receiving hole therein into which said sleeve is insertable, said cable receiving port portion having a through-hole which opens through both an inner surface of said cable receiving hole and said outer surface of said cable receiving port portion, said disengagement preventing claw being resiliently restored into said through-hole when said sleeve is inserted into said cable receiving hole, so that a foremost end of said disengagement preventing claw is brought into engagement with an inner surface of said through-hole; and wherein said through-hole serves as a means for disengaging said disengagement preventing claw.

3. An optical connector as recited in claim 2, wherein said sleeve has the optical cable mounted therein.

4. An optical connector as recited in claim 2, wherein said through-hole extends radially outwardly from said cable receiving hole.

* * * * *